(12) United States Patent
Tenghamn et al.

(10) Patent No.: US 7,737,698 B2
(45) Date of Patent: Jun. 15, 2010

(54) LOW NOISE, TOWED ELECTROMAGNETIC SYSTEM FOR SUBSURFACE EXPLORATION

(75) Inventors: Stig Rune Lennart Tenghamn, Katy, TX (US); Rune Johan Magnus Mattsson, Balsta (SE); Peter Gunnar Krylstedt, Sundbyberg (SE); Mattias Fredrik Karlsson, Bandhagen (SE); Ulf Peter Lindqvist, Segeltorp (SE); Per Anders Davidsson, Spånga (SE)

(73) Assignee: PGS Geophysical AS, Lysaker (NO)

( * ) Notice: Subject to any disclaimer, the term of this patent is extended or adjusted under 35 U.S.C. 154(b) by 900 days.

(21) Appl. No.: 11/520,228

(22) Filed: Sep. 13, 2006

(65) Prior Publication Data

US 2007/0229083 A1    Oct. 4, 2007

Related U.S. Application Data

(60) Provisional application No. 60/787,042, filed on Mar. 29, 2006.

(51) Int. Cl.
*G01V 3/12* (2006.01)
(52) U.S. Cl. .................. 324/347; 324/365; 324/350
(58) Field of Classification Search ............... 324/323, 324/337, 334, 347, 365, 350
See application file for complete search history.

(56) References Cited

U.S. PATENT DOCUMENTS 4,175,432 A    11/1979    Gibson et al.

7,002,350 B1    2/2006    Barringer

FOREIGN PATENT DOCUMENTS

| GB | 1 490 870 | 11/1977 |
|---|---|---|
| GB | 2 390 904 | 12/2004 |
| RU | 1426256 | 9/1996 |
| SU | 113924 | 1/1958 |
| SU | 940042 | 1/1982 |
| SU | 1053041 | 11/1983 |
| SU | 1679446 | 9/1991 |

OTHER PUBLICATIONS

M.C. Sinha, P.D. Patel, M.J. Unsworth, T.R.E. Owen, M.R.G. MacCormack, "An Active Source Electromagnetic Sounding System for Marine Use", (1990) Marine Geophysical Researches, pp. 59-68, vol. 12.
Alan D. Chave, Steven C. Constable, R. Nigel Edwards, "Electrical Exploration Methods for the Seafloor", (1991) Geophysics, pp. 931-966, No. 3.
S.J. Cheesman, R.N. Edwards, A.D. Chave, (1987) "On the theory of sea-floor conductivity mapping using transient electromagnetic systems", Geophysics, pp. 204-217, vol. 52, No. 2.
K.M. Strack, (1992) "Exploration With Deep Transient Electromagnetics", Elsevier, Chapter 5, pp. 127-151.
Michael L. Burrows, "Motion-Induced Noise in Electrode-Pair Extremely Low Frequency (ELF) Receiving Antennas", (1974) IEE Transactions on Communications, pp. 540-542.

*Primary Examiner*—Reena Aurora
(74) *Attorney, Agent, or Firm*—E. Eugene Thigpen; Richard A. Fagin

(57) ABSTRACT

A detector for a marine electromagnetic survey system includes a housing arranged to minimize turbulence when the housing is towed through a body of water, and to minimize motion of the housing in any direction other than the tow direction. The housing includes at least one of an electric field and a magnetic field sensing element associated therewith.

22 Claims, 6 Drawing Sheets

LOW NOISE, TOWED ELECTROMAGNETIC SYSTEM FOR SUBSURFACE EXPLORATION

CROSS-REFERENCE TO RELATED APPLICATIONS

This application claims priority under 35 U.S.C. 119(e) to U.S. Provisional Application Ser. No. 60/787,042, filed on Mar. 29, 2006, entitled "Low Noise, Towed Electromagnetic System for Subsurface Exploration", the disclosure of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic survey apparatus for subsurface exploration in the Earth. More particularly, the invention relates to structures for detector electrodes and arrays thereof for detection of induced voltages resulting from electromagnetic fields imparted into the Earth.

2. Background Art

Electromagnetic surveying is used for, among other purposes, determining the presence of hydrocarbon bearing structures in the Earth's subsurface. Electromagnetic surveying includes what are called "controlled source" survey techniques. Controlled source electromagnetic surveying techniques include imparting an electric current or a magnetic field into the Earth, when such surveys are conducted on land, or imparting the same into sediments below the water bottom (sea floor) when such surveys are conducted in a marine environment. The techniques include measuring voltages and/or magnetic fields induced in electrodes, antennas and/or magnetometers disposed at the Earth's surface or on the sea floor. The voltages and/or magnetic fields are induced by interaction of the electromagnetic field caused by the electric current and/or magnetic field imparted into the Earth's subsurface (through the water bottom in marine surveys) with the subsurface Earth formations.

Marine controlled source electromagnetic surveying known in the art typically includes imparting alternating electric current into the sediments below the water bottom by applying current from a source, usually disposed on a survey vessel, to a dipole electrode towed by the survey vessel. A dipole electrode is typically an insulated electrical cable having two electrodes thereon at a selected spacing, sometimes 300 to 1000 meters or more. The alternating current has one or more selected frequencies, typically within a range of about 0.1 to 100 Hz. A plurality of detector electrodes is disposed on the water bottom at spaced apart locations, and the detector electrodes are connected to devices that record the voltages induced across various pairs of such electrodes. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R. (1990), *An active source electromagnetic sounding system for marine use*, Marine Geophysical Research, 12, 29-68. Other publications which describe the physics of and the interpretation of electromagnetic subsurface surveying include: Constable, S. C. and Edwards, R. N. (1991), *Electrical exploration methods for the seafloor*: Investigation in Geophysics No 3, Electromagnetic methods in applied geophysics, vol. 2, application, part B, 931-966; and Cheesman, S. J., Edwards, R. N., and Chave, A. D. (1987), *On the theory of sea-floor conductivity mapping using transient electromagnetic systems*: Geophysics, 52, No. 2, 204-217.

Another technique for electromagnetic surveying of subsurface Earth formations known in the art is transient controlled source electromagnetic (t-CSEM) surveying. In t-CSEM surveying, electric current is imparted into the Earth's subsurface using electrodes on a cable similar to those explained above as used for f-CSEM. The electric current may be direct current (DC). At a selected time or times, the electric current is switched off, and induced voltages are measured, typically with respect to time over a selected time interval, using electrodes disposed on the water bottom as previously explained with reference to f-CSEM surveying. Structure and composition of the Earth's subsurface are inferred by the time distribution of the induced voltages. t-CSEM surveying techniques are described, for example, in Strack, K.-M. (1992), *Exploration with deep transient electromagnetics*, Elsevier, 373 pp. (reprinted 1999).

Irrespective of the technique used, the presence of hydrocarbon bearing structures can be inferred because of resistivity contrast between hydrocarbon bearing structures, which can have electrical resistivities in a range of several ohm-meters to several hundred ohm-meters, and those of the adjacent, non hydrocarbon bearing Earth formations, which may have resistivities in a range of about 0.2 ohm-meters to several ohm-meters.

The foregoing electromagnetic survey techniques can be time consuming and expensive to perform, mainly because the detector electrodes are typically disposed in cables that are deployed on the water bottom. Deploying such detector electrode cables typically includes unspooling them from the survey vessel or another deployment vessel, locating the geodetic position of the electrodes after deployment, and retrieving the cables after the survey is completed. To survey a substantial area of the Earth's subsurface, therefore, requires deployment of a substantial number of such cables and/or repeatedly deploying the cables in different positions along the water bottom. The principal reason that water bottom deployed (stationary) detector cables are used is that the voltages induced across pairs of the electrodes from electromagnetic effects are small enough such that noise that would be induced in the electrodes were they to be moved through the water would make it difficult to measure the voltages induced by electromagnetic effects.

Towing electrodes on cables is known in the art for certain types of marine surveying, particularly as stated above, for imparting an electric field into the formations below the water bottom. Using towed electrodes known in the art for electromagnetically induced voltage detecting, however, is difficult to perform using electrodes known in the art, particularly because towed cables vibrate as they move through the water. This phenomenon as it affects electrodes mounted on a cable was studied early on in relation to submarine receiving antennas. As a result of such study a number of noise sources were identified. See, for example, M. L. Burrows, IEEE Trans. Comm., 22 (1974) 540.

A significant source of noise results from the motion of the electrodes and interconnecting cables within the Earth's geomagnetic field, that is, electromagnetic induction. The motion is excited by pressure fluctuations along the cable as it moves through the water, which makes it start vibrating. For a long cable it can be shown that the motion-induced voltage is proportional to $v^{5/2}/f^2$, where v and f are the towing speed and the signal frequency, respectively. Frequencies used for submarine communication antennas are above 60 Hz, and as a result of frequency dependence of the noise, the resulting noise can be dealt with. However, for frequencies often used for hydrocarbon exploration, which are approximately 0.4-0.8 Hz, induction noise is difficult to deal with. Using a formula developed by Burroughs and disclosed in the foregoing IEEE publication, the noise level would be expected to be on the order of $0.3\ \mu V/Hz^{1/2}m$ at the frequencies of interest and a towing speed of 5 knots. Such noise level is unacceptably high in relation to the voltages expected to be measured in typical electromagnetic surveying.

Other significant noise sources are electrode noise, water motion noise and thermal noise. Electrode noise arises from the water motion disturbing the electrochemical double layer at the electrode surface. Water motion noise can be associated with induction in the geomagnetic field from water turbulence. Thermal noise will always be present if there are temperature gradients proximate the electrodes.

What is needed is a system for acquiring electromagnetic survey data that can be towed in the water similarly to a seismic streamer system such that the speed and efficiency of acquiring electromagnetic survey data are improved. Such a system should be configured to minimize noise that may be induced in the sensing elements as a result of movement of water past the sensing elements and movement of the sensing elements other than along the direction of towing.

SUMMARY OF THE INVENTION

In its most general sense, the invention is a detector for a marine electromagnetic survey system that includes a housing arranged to minimize turbulence when the housing is towed through a body of water, and to minimize motion of the housing in any direction other than the tow direction. The housing includes an electric field or magnetic field sensing element associated therewith.

Another aspect of the invention is a marine electromagnetic survey system detector. A detector according to this aspect of the invention includes a housing formed from electrically substantially non-conductive material. The housing is shaped to provide a surface for placement of an electrode disposed within substantially laminar flowing water as the housing is moved through water. The housing shaped to provide minimal resistance to flow of water therepast. Fins are coupled to the housing and project outwardly from the housing. The fins are shaped to stabilize motion of the housing through the water and each provides an attachment location for a tow cable. The fins are disposed symmetrically about the housing. The detector includes an electrode disposed on the surface of the housing. The electrode is formed from an electrically conductive, substantially non-metallic material.

In one embodiment, the housing defines an interior chamber having voltage measuring circuits therein.

Another aspect of the invention is a marine electromagnetic survey system. An electromagnetic survey system according to this aspect of the invention includes a survey vessel arranged to tow a cable through a body of water. The survey vessel has equipment thereon for energizing source electrodes. The equipment includes a recording device for recording signals corresponding to voltages detected between at least one pair of detectors. The system includes at least two source electrodes disposed at selected positions along the cable and at least one pair of detectors coupled behind an aft end of the cable. Each detector includes a housing formed from electrically substantially non-conductive material. Each housing is shaped to provide a surface for placement of an electrode disposed in substantially laminar flowing water as each such housing is moved through the water. Each housing is shaped to provide minimal resistance to flow of water therepast. Each detector includes fins coupled to the respective housing and projecting outwardly from each respective housing. The fins are shaped to stabilize motion of the respective housing through the water, and to provide an attachment location for a tow cable. The fins are disposed symmetrically about the housing. Each detector includes an electrode disposed on the surface. The electrode is formed from an electrically conductive, substantially non-metallic material.

In one embodiment, each housing defines an interior chamber having voltage measuring circuits therein.

Another aspect of the invention is a method for marine electromagnetic surveying. A method according to this aspect of the invention includes moving a field source generator through a body of water. At selected times an electrical current is passed through the field source generator and induces at the generator at least one of a time varying magnetic field and a time varying electric field in formations below the bottom of the body of water. At least one sensing element is moved through the body of water along a tow direction. Using the sensing element, at least one of a magnetic field and an electric field resulting from interaction of the induced field with the formations is detected. The moving is performed so as to minimize turbulence in the water and to minimize motion of the sensing element other than along the tow direction.

Other aspects and advantages of the invention will be apparent from the following description and the appended claims.

DETAILED DESCRIPTION

In the description of the invention herein, the term "detector" will be used to mean a device towed by a survey vessel or other vessel on a cable, which device includes one or more sensing elements for detecting one or more aspects of the interaction of electromagnetic fields with the formations in the Earth's subsurface. The electromagnetic fields may be induced in the Earth's subsurface by generating a time varying electric field or a time varying magnetic field in a body of water at a selected depth below the water surface. Generally, the one or more sensing elements can be galvanic electrodes disposed on, or magnetic field sensors disposed within a housing. The housing is configured to minimize water turbulence as it is towed through the body of water, and is configured to minimize motion of the housing in any direction other than along the direction of towing of the housing.

Figure 1:
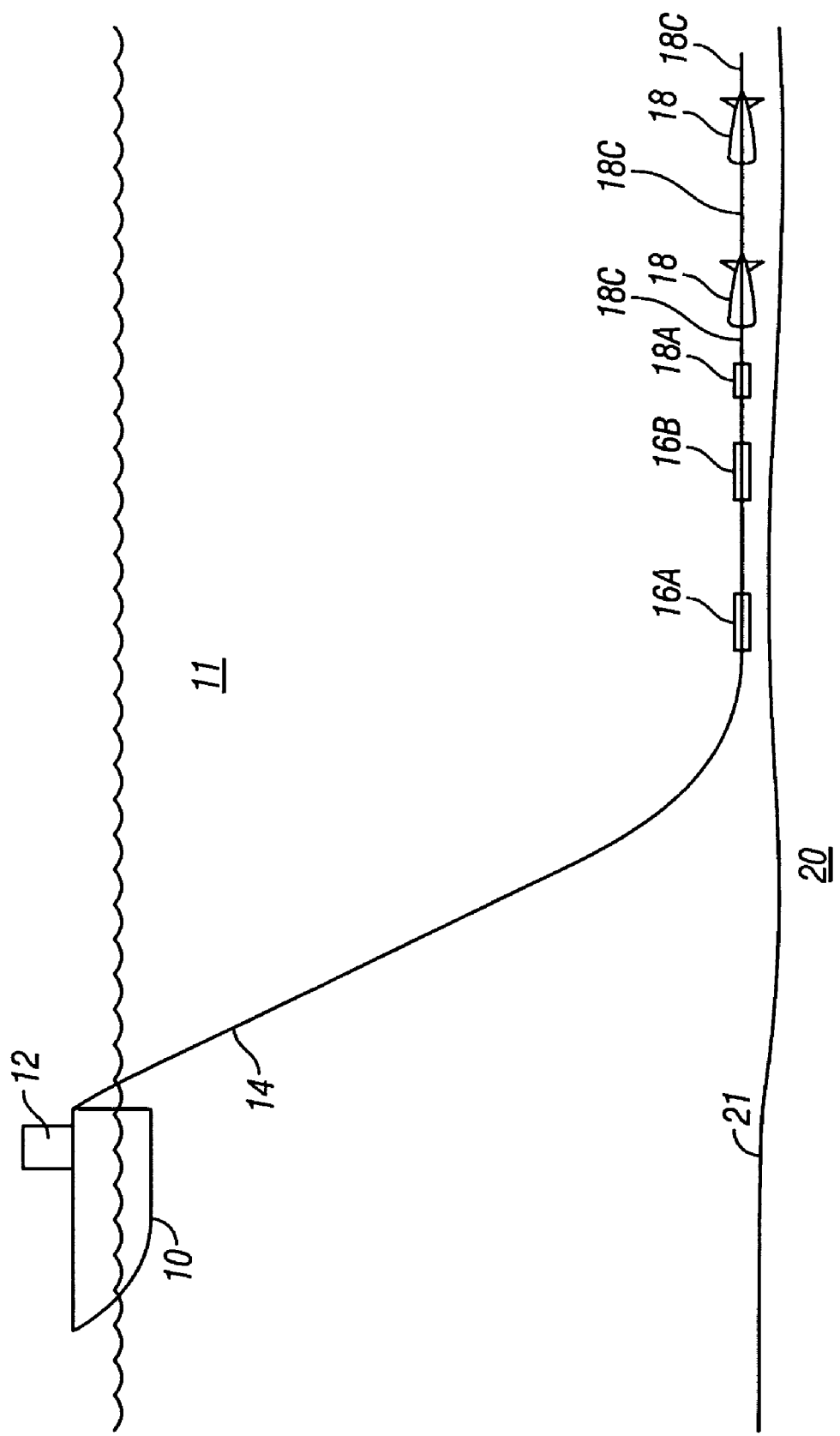
FIG. 1 shows one embodiment of an electromagnetic survey system according to the invention.

One embodiment of a marine controlled source electromagnetic survey system according to the invention is shown in FIG. 1. In the embodiment of FIG. 1, an electromagnetic field is imparted into the Earth's subsurface by generating a time varying electric field at a selected depth below the water surface. In the present embodiment, the electric field is generated by applying electric current across a pair of spaced apart source electrodes. In FIG. 1, a survey vessel 10 moves along the surface of a body of water 11 such as a lake or the ocean. The survey vessel 10 may include electronic devices thereon, shown collectively as a "recording system" 12 for imparting electrical survey current into the Earth formations 20 below the water bottom 21 through various electrodes. The equipment in the recording system 12 may also include devices (not shown separately) for detecting and recording signals corresponding to voltages detected across one or more pairs of detectors 18, each such detector having at least one electrode (shown in FIG. 2) thereon. Equipment in the recording system 12 may also include devices (not shown separately) for determining the geodetic position of the vessel 10 and the various detectors 18 in the system. The electrodes on the detectors 18 will be explained in more detail below with reference to FIG. 2.

In the present embodiment, the electrical survey current may be imparted through a dipole pair of source electrodes 16A, 16B separated from each other by a selected distance. The selected distance will depend on, among other factors, the depth in the Earth's subsurface 20 which is to be surveyed and the expected resistivities of the formations in the Earth's subsurface. The source electrodes 16A 16B may be towed by a suitable survey cable 14 deployed by the survey vessel 10 or by another vessel. The survey cable 14 may include electrical conductors (not shown separately) for transferring the electrical survey current from the recording unit 12 to the source electrodes 16A, 16B and for transferring to the recording system 12 signals related to voltages imparted across electrodes on pairs of the various detectors 18, as will be further explained below. Structures for the source electrodes 16A, 16B are known in the art. The source electrodes 16A, 16B are shown in FIG. 1 arranged as a horizontal electric dipole. In other implementations, the source electrodes may be arranged as a vertical electric dipole.

In the present embodiment, the survey cable 14 may include at its aft end a crossover coupling and telemetry unit, shown generally at 18A. The crossover coupling and telemetry unit 18A in the present embodiment forms mechanical and electrical connection between the aft end of the survey cable 14 and to detector tow cables 18C for towing two or more of the detectors 18. The detectors 18 may be disposed along the detector tow cables 18C at spaced apart locations as shown in FIG. 1. The tow cables 18C in other embodiments may be coupled directly to the vessel 10. The number of and spacing of the detectors 18 used in any particular embodiment of an electromagnetic survey system will depend on, among other factors, the resolution desired for the survey results, and the resistivities of the formations in the Earth's subsurface 20. The detectors 18 may be towed by the survey vessel 10 as shown in FIG. 1, or may be towed by a different vessel. The crossover coupling and telemetry unit 18A may also include circuitry (not shown in FIG. 1) for converting signals related to the detected voltages imparted across the various detectors 18 into an electrical or optical telemetry format for transmitting to the recording system 12, or may be a simple mechanical and electrical junction between the survey cable 14 and the detector tow cables 18C. Additionally or alternatively, the crossover coupling and telemetry unit 18A may include circuits (not shown) for locally recording signals corresponding to the detected voltages.

In operating the system shown in FIG. 1, as the survey vessel 10 moves through the water 11, the recording system causes electrical survey current to be imparted across the source electrodes 16A, 16B. If the system is to measure transient electromagnetic effects, the electrical current may be switched direct current, alternating polarity direct current, either discretely switched or in a sequence such as a pseudo random binary. If the system is to measure frequency domain electromagnetic effects, the current may be alternating current having one or more frequencies in a range of about 0.1 to 100 Hz. The waveform of the alternating current may be sinusoidal, triangular, square wave or other periodic waveform, depending on the desired frequency content thereof. While, or after the source electrodes 16A 16B are so energized (depending on whether transient or frequency domain effects are being measured), voltages are measured across selected pairs of the detectors 18. Measurements corresponding to the amplitude and/or phase of the induced voltages (phase with respect to the electrical current imparted across the source electrodes 16A, 16B), and/or amplitude with respect to current switching time, are then used to infer the structure and/or composition of the subsurface 20. The detectors 18 may be towed at the same or different depth than the source electrodes 16A, 16B.

Figure 2:
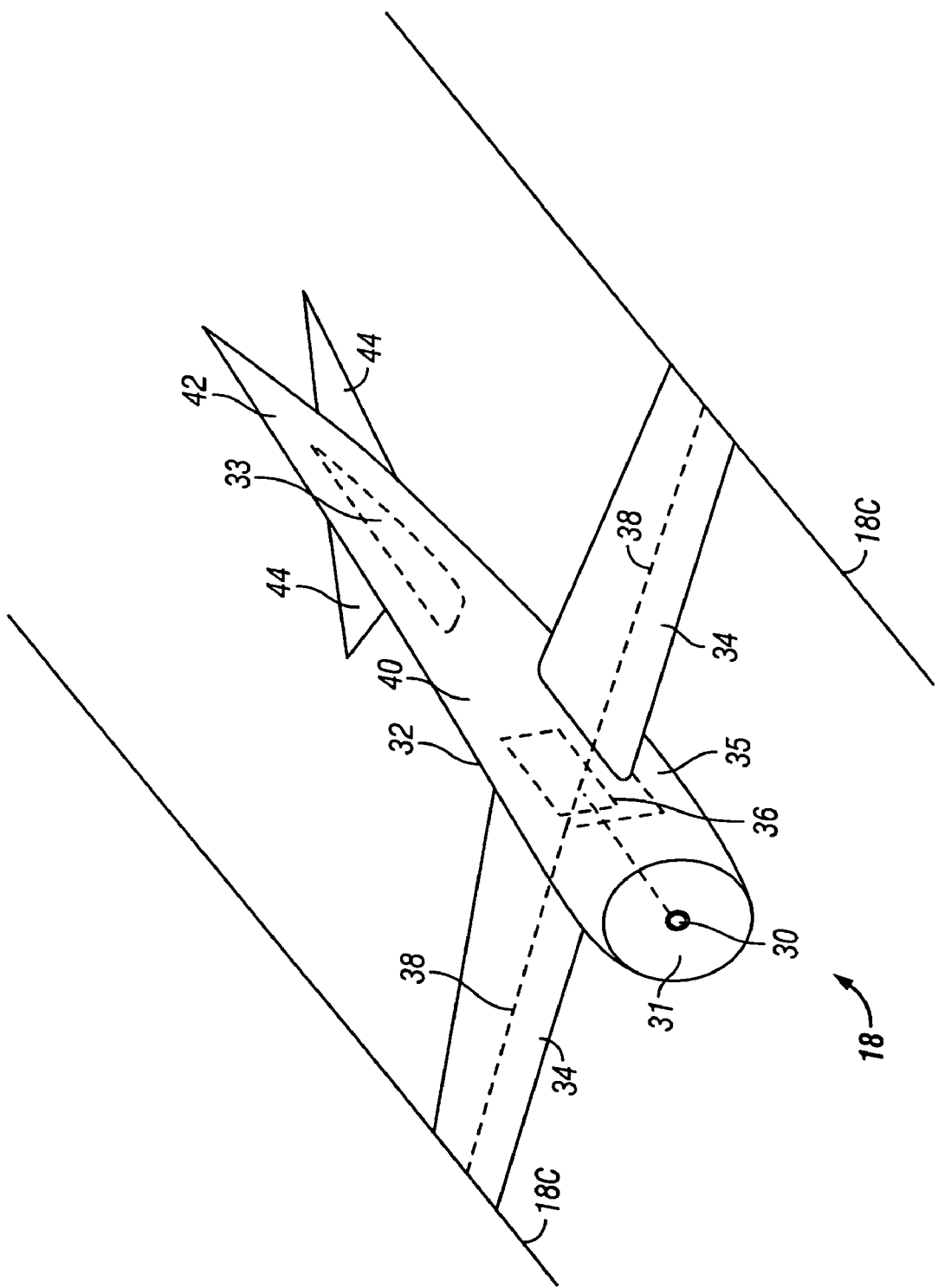
FIG. 2 shows one embodiment of an electrode used with a survey system according to the invention.

One embodiment of a detector 18 is shown in more detail in FIG. 2. The detector 18 may include a generally torpedo-shaped housing 32, preferably formed from glass fiber reinforced plastic or similar high strength, electrically non-conductive and corrosion resistant material. The housing 32 may include a generally blunt, rounded nose 31, onto which a sensing element, which in this embodiment is an electrode 30, is suitably disposed thereon. The electrode 30 may be formed from graphite or other electrically conductive, non-metallic material to avoid any changes in its electrical impedance caused by corrosion, as would occur with many metals if used for the electrode 30. The nose 31 will generally be disposed within laminar flowing water as the housing 32 is moved through the water. Thus, the electrode 30 so positioned will be less susceptible to having turbulence-induced electrical noise introduced therein.

The housing 32 may include a generally elliptically shaped mid-section 40 and a generally conically shaped tail section 42. The shapes of the various sections (nose 31, mid-section 40 and tail 42) of the housing 32 are preferably such that the housing 32 may move through the water (11 in FIG. 1) with a minimum of hydrodynamic resistance, induce as little turbulence in the water as practical and provide a surface for the electrode 30 that will be disposed in substantially laminar flowing water.

Motion of the housing 32 through the water may be stabilized by coupling generally wing-shaped fins 34 at a suitable location along the housing 32. The fins 34 may be affixed to the housing 32 or may be integrally formed therewith. The outermost edge of each of the fins 34 can also be the place at which the detector tow cables 18C are coupled to the housing 32. As shown in FIG. 2, the detector tow cables 18C may be affixed to the outermost edges of the fins 34 so as extend generally parallel to each other along the direction of motion of the detector tow cables 18C. The fins 34 are preferably symmetrically placed with respect to the housing 32 on opposed sides thereof. Although shown in FIG. 2 as being horizontally separated, the detector tow cables 18C may also be vertically separated. Horizontal separation of the tow cables 18C may reduce induction noise caused by motion of the tow cables 18C within the Earth's geomagnetic field is electrically connected as will be further explained below with reference to FIG. 3.

The housing 32 may also include two or more, generally circumferentially symmetrically placed stabilizers 42 near the aft end of the housing 32. The fins 34 and stabilizers 42 may be integrally formed with the housing 32 or separately formed and affixed to the housing 32. In combination, the fins 34 and stabilizers 42 cause the housing 32 to move through the water with high directional stability. High directional stability, among other possible benefits, may reduce the amount noise being induced in the tow cables 18C by undue movement of the tow cables 18C with respect to the Earth's geomagnetic field.

The housing 32 may also be formed to define one or more sealed interior compartments 33 including therein oil or similar electrically non-conductive, substantially incompressible fluid. The total volume of the compartments, and the density of such fluid (and the enclosed volume of a defined chamber that will be further explained below) can be selected to provide the housing 32 with substantially neutral buoyancy in the water.

The housing 32 may also be formed to define a sealed interior chamber 35, in which suitable amplification and telemetry circuitry, shown generally at 36, may be located. The circuitry 36 is used to detect voltages imparted across the electrode 30 and another, similarly formed electrode in another one of the detectors 18 disposed along the detector tow cables 18C. The circuitry 36 may be electrically connected to each of the detector tow cables 18C by suitable wiring, shown at 38. The circuitry 36 and the wiring 38 will be explained in more detail with reference to FIG. 3.

The present embodiment includes two, symmetrically placed, substantially coplanar detector tow cables 18C coupled to respective ones of the fins 34 in order to accomplish several objectives. First, electrical power may be conducted to the circuits 36, signals may be conducted from the circuits 36, and voltages or other representative signals may be transmitted along electrical conductors (see FIG. 4) in the detector tow cables 18C substantially symmetrically, so as to avoid inducing stray voltages in the electrode 30. Second, the arrangement of the detector tow cables 18C as shown in FIG. 2, being substantially coplanar and symmetric with respect to the detectors 18, may improve the stability of movement of the detector 18 through the water. Preferably the detector tow cables 18C have as small a diameter as is practical to reduce the effects of any turbulence induced by moving the detector tow cables 18C through the water. Additionally, the use of two detector tow cables is intended to substantially cancel out any voltages that may be induced in the detector tow cables 18C a result of any motion instability of the detectors 18 and detector tow cables 18C within the Earth's geomagnetic field, as explained previously.

Preferably the detector tow cables 18C are as thin as practical with respect to the drag forces required to be carried by the tow cables 18C, not only to reduce drag, as explained above, but also to increase the vibration frequency of any turbulence-induced vibration in the tow cables 18C. Further, using thin tow cables minimizes their mass, thus minimizing any effects of the tow cables 18C on the motion of the detectors 18.

The embodiment shown in FIG. 1 includes detectors arranged so that voltages are measured across a horizontal electrode pair. In other embodiments, one or more of the detectors may be arranged to measure voltage in a vertical or other orientation using separate tow cables and suitable structures for maintaining the relative positions of the various detectors.

Figure 3:
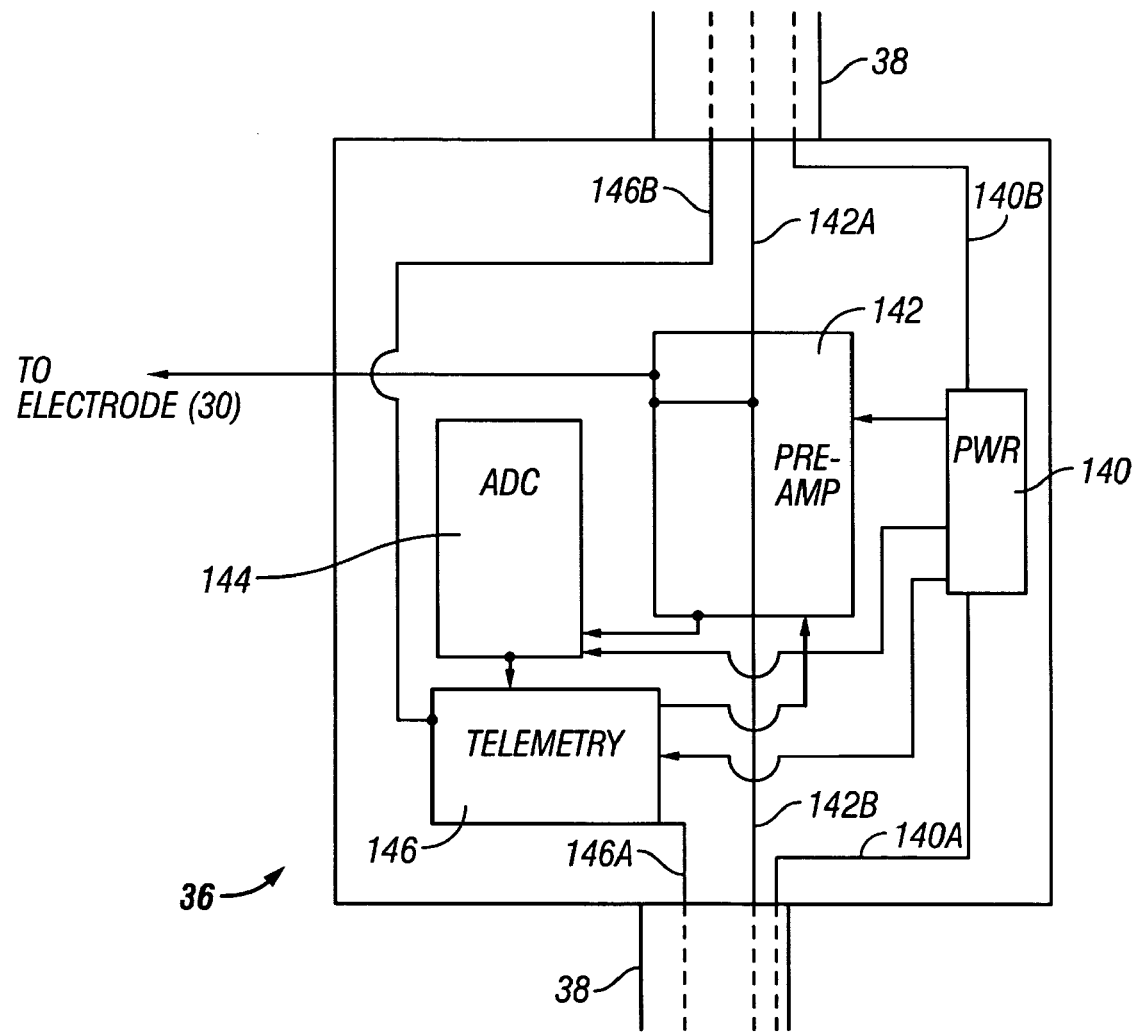
FIG. 3 shows one embodiment of detecting and telemetry circuitry that may be used in various embodiments of the invention.

One embodiment of the circuitry 36 is shown schematically in FIG. 3. The circuitry 36 may include a power converter 140 which accepts electrical power from conductors in the detector tow cables (18C in FIG. 2) through suitable symmetric connections, such as electrical conductors 140A, 140B in the wiring 38. In a preferred embodiment direct current (DC) voltage is supplied by means of conductors 140A and 140B, and power converter 140 is a DC-DC converter. In an alternate embodiment alternating current (AC) power is supplied to the power converter 140 preferably at relatively high frequency, 500 Hz or more, so as to avoid inducing detectable voltages in the electrodes (18 in FIG. 2), and power converter 140 is an AC-DC converter. The power converter 140 may supply suitable electrical power to a preamplifier 142, an analog to digital converter (ADC) 144 and a telemetry transceiver 46.

The preamplifier 142 has one input terminal electrically coupled to the electrode (30 in FIG. 2). The other input terminal of the preamplifier may be electrically coupled, such as through conductors 142A, 142B to a selected one of the electrodes (18 in FIG. 2) disposed along the detector tow cables (18C in FIG. 2). Output of the preamplifier 42 may be digitized by the ADC 144, and conducted to the telemetry transceiver 146 for inclusion in any suitable telemetry scheme. The telemetry transceiver may be electrically coupled to suitable conductors 146A 146B in the wiring 38. The various conductors 142A, 142B, 146A, 146B are coupled to corresponding conductors in the detector tow cables 18C as will be explained in more detail below with reference to FIG. 4.

In some embodiments, a control signal may be transmitted to the telemetry transceiver 146 (typically from the recording unit 12 in FIG. 1) to cause the preamplifier 142 to be selectively coupled at the one input terminal to the conductors 142A 142B, such that the voltage imparted to the input of the preamplifier 142 is between selected ones of the detectors (18 in FIG. 1) along the detector tow cables (18C in FIG. 1). Thus, the spacing between the detectors and corresponding electrodes thereon may be selectable in such embodiments.

Figure 4:
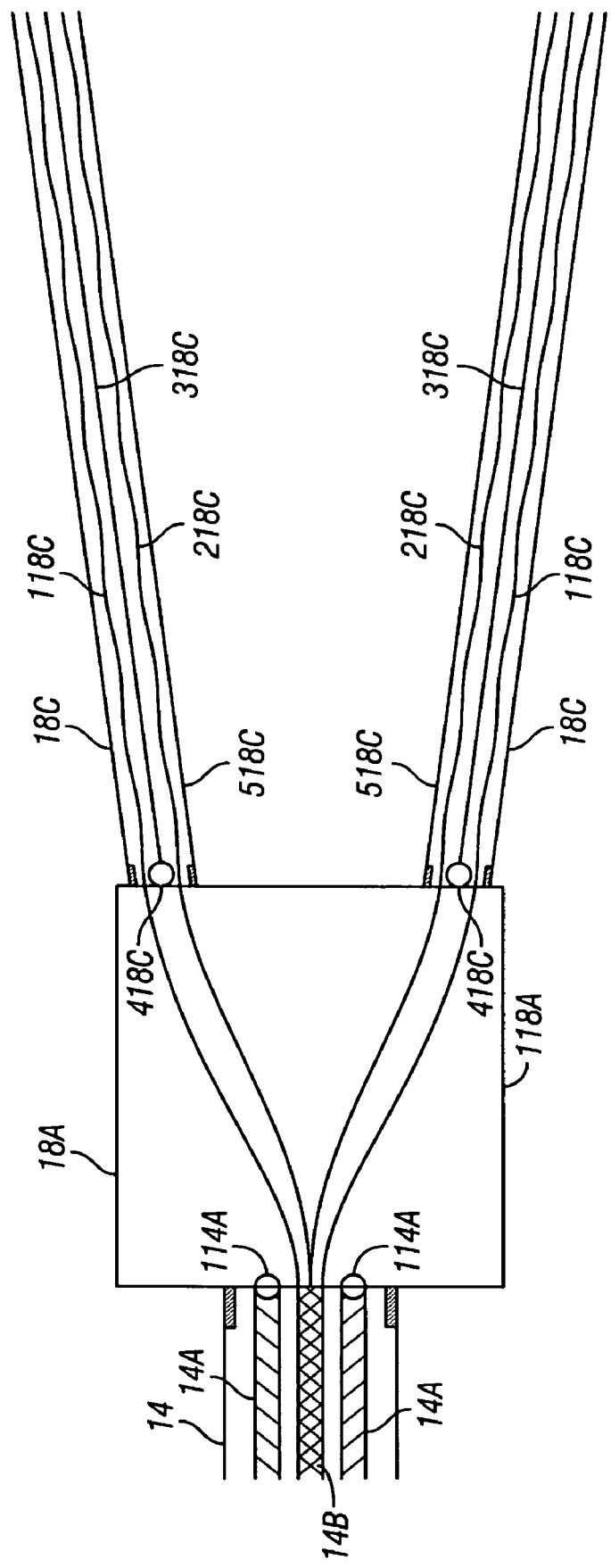
FIG. 4 shows one embodiment of a coupling for attaching detectors and their associated tow cables to the aft end of a cable towed by a survey vessel.

One embodiment of the crossover coupling and telemetry unit 18A is shown schematically in FIG. 4. The unit 18A may include a sealed, pressure resistant housing 118A formed from steel or other high strength material. The housing 118A includes load transfer devices 114A to couple to one or more strength members 14A in the survey cable 14 at the aft end thereof. The load transfer devices 114A couple the tension carried by the strength members 14A to the housing 118A. The housing 118A is preferably arranged to sealingly engage the survey cable 14 so as to exclude water from the interior of both the survey cable 14 and the housing 118A. Electrical and/or optical conductors forming part of a harness 14B pass through an opening into the interior of the housing 118A and are operatively coupled to respective power conductors 118C and telemetry conductors 218C in each of the detector tow cables 18C. Each detector tow cable 18C may include a water resistant exterior jacket 518C adapted to sealingly engage the housing 118A so as to exclude water from the interior of the housing 118A and each to cable 18C. Each detector tow cable can include a strength member 318C preferably formed from fiber rope such as a fiber sold under the trademark VECTRAN, which is a registered trademark of Hoescht Celanese Corp., New York, N.Y. Each strength member 318C is coupled to a respective load transfer device 418C in the housing 118A to transfer tension load from the housing 118A to each detector tow cable 18C.

Figure 5:
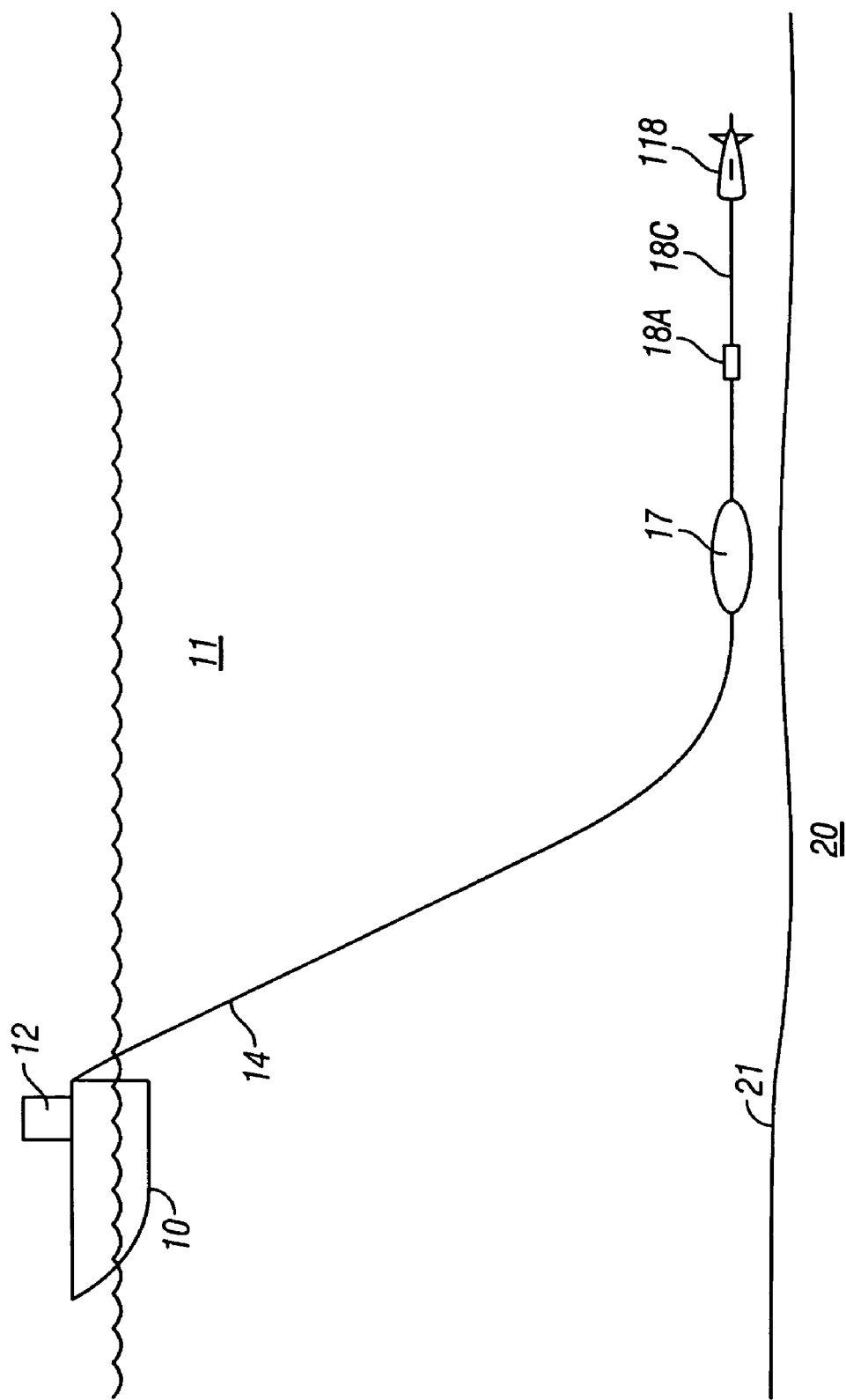
FIG. 5 shows an alternative embodiment of an acquisition system using an antenna as a transmitting element and a detector having magnetic sensors therein.

As previously explained, electromagnetic surveying known in the art includes imparting time varying magnetic fields into the Earth's subsurface, and detecting magnetic fields that result from interaction of the imparted time varying fields with the various formations in the subsurface. Another embodiment of a system according to the invention is shown in FIG. 5 which includes magnetic field generating and detecting devices for such purposes. FIG. 5 shows a survey vessel 10 having a recording system 12 thereon moving through a body of water 11, as explained above with reference to FIG. 1. The vessel 10 pulls a suitable survey cable 14 through the water 11. In the present embodiment, a loop antenna 17 is towed at the end of the survey cable 14. The loop antenna 17 can be coupled to a similar electric survey current source in the recording system 12 to that explained with reference to FIG. 1. In the embodiment of FIG. 5, as the current is passed through the loop antenna 17, a magnetic field is induced. The antenna 17 as shown in FIG. 1 produces a vertical magnetic dipole, but other dipole orientations may be used in other implementations.

At the aft end of the antenna 17, a crossover coupling and telemetry unit 18A, similar to that explained with reference to FIG. 4 can be used to couple the end of the survey cable 14 to tow cables 18C substantially as explained with reference to FIG. 4. The tow cables 18C are coupled to at least one detector 118, and preferably a plurality of such detectors at spaced apart locations along the tow cables (similar to what is shown in FIG. 1). The detector 118 in FIG. 5 may include one or more magnetic field sensor elements (magnetometers) therein, and may or may not include a galvanic electrode as explained with reference to FIG. 2. The structure of the detector 118 may be substantially similar to the structure explained above with reference to FIG. 2, in particular including a housing arranged to minimize generation of turbulence and to minimize motion thereof other than along the tow direction. The magnetometer, as will be explained below, detects magnetic fields resulting from interaction of the imparted electromagnetic field with the subsurface 20 and generates corresponding signals that may be recorded in the recording system 12 or elsewhere for interpretation. Various aspects of the detected magnetic fields are used to infer structure of and composition of the various formations in the subsurface 20. If magnetometers are used in the present embodiment, it is preferable that the detector housing be made from a substantially non-magnetic material. The plastic compositions explained with reference to FIG. 2 will of course have such properties. If an electrode will not be disposed on any part of the detector 118, the detector housing may be (but need not be) electrically conductive, although it should be non-magnetic. Materials such as monel may be used in such implementations. The present embodiment of the detector 118 may include any or all of the features of the housing explained above with reference to FIG. 2 provided that the detector 118 is arranged to minimize turbulence and motion other than along the tow direction.

Figure 6:
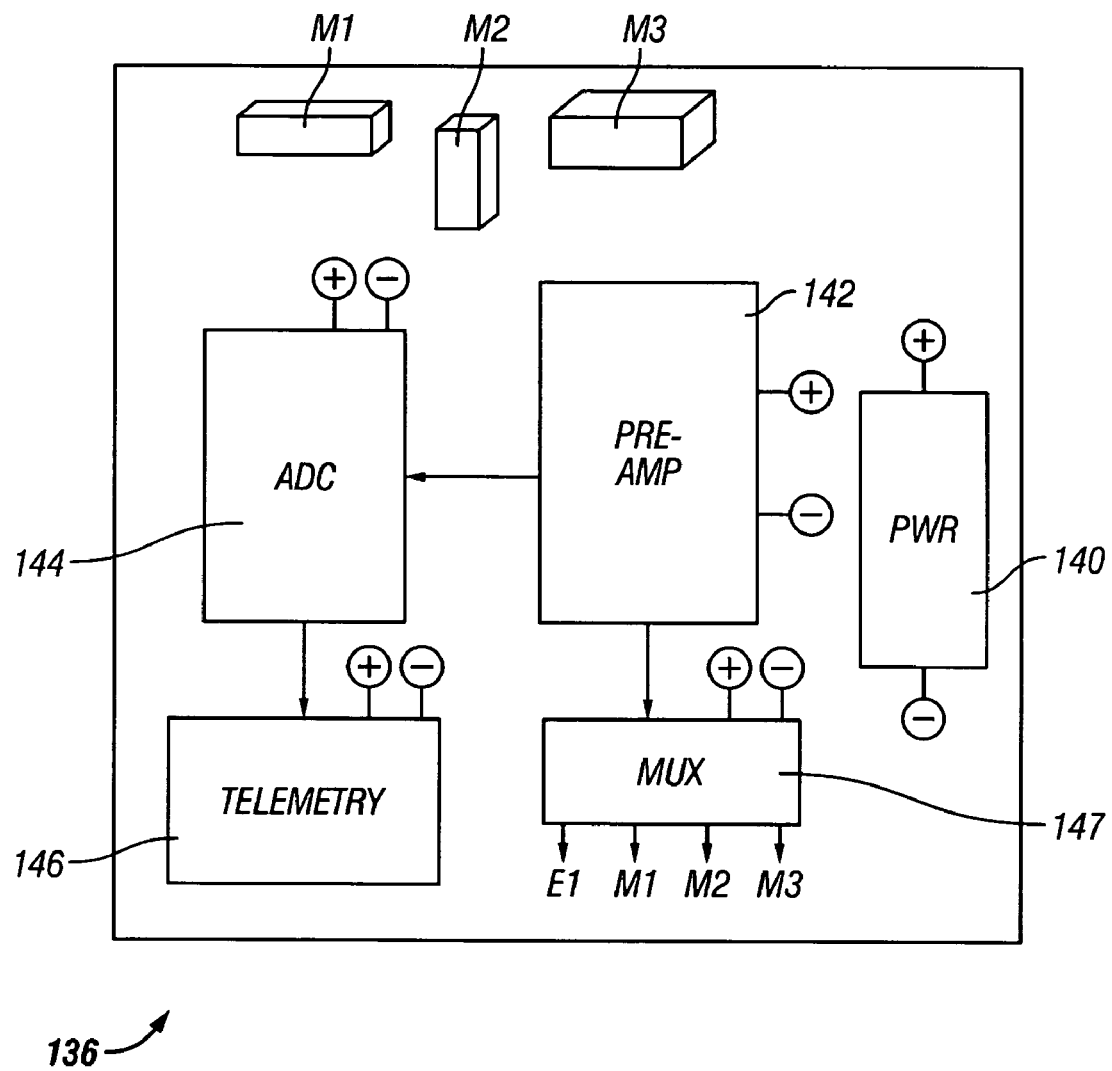
FIG. 6 shows an alternative embodiment of detecting circuitry having magnetometers therein.

Referring to FIG. 6, circuitry 136 that may include one or more magnetometers, can be used in a detector as shown in FIG. 5. Most of the components of the circuitry 136 may be substantially similar to the circuitry explained above with reference to FIG. 3, including an ADC 144, preamplifier 142, power supply 140 and telemetry transceiver 146. The present embodiment may include one or more magnetometers, shown at M1, M2, M3. The magnetometers M1, M2, M3 may be flux-gate devices such as are used to detect the Earth's geomagnetic field, or similar device. The magnetometers M1, M2, M3 in FIG. 6 may be oriented substantially orthogonally with respect to each other for convenience, or may be in other orientations. The magnetometers M1, M2, M3 have their signal outputs coupled to corresponding input terminals of a multiplexer 147 interposed between them and the preamplifier 142. The multiplexer 147 may include additional input terminals, such as shown at E1 coupled to one or more electrodes, if such are used in any particular implementation. In the present embodiment, both an electrode, as explained with reference to FIG. 2, and at least one magnetometer may be used in the detector (118 in FIG. 5).

The present embodiment of the detector (118 in FIG. 5) may also be used with the electric field generating device shown in FIG. 1. In such implementations, the magnetometers M1, M2, M3 detect magnetic fields resulting from interaction of the time varying electric field with the various formations in the subsurface (20 in FIG. 1). Irrespective of the particular implementation, whether electric fields are generated and voltages detected, or whether magnetic fields are induced and detected, or any combination thereof, by minimizing water turbulence and motion of the detector other than along the tow direction, noise detected by the sensing elements will be minimized, which can materially enhance the ability to conduct an electromagnetic survey while moving the detectors. Such survey techniques may improve the speed and efficiency of electromagnetic surveying.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic survey system detector, comprising:
    a housing formed from electrically substantially non-conductive material, the housing shaped to provide a surface for placement of an electrode disposed in substantially laminar flowing water as the housing is moved through water, the housing shaped to provide minimal resistance to flow of water therepast;
    fins coupled to the housing and projecting outwardly therefrom, the fins shaped to stabilize motion of the housing through water and each to provide attachment location for a tow cable, the fins disposed symmetrically about the housing; and
    an electrode disposed on the surface, the electrode formed from an electrically conductive, substantially non-metallic material.

2. The detector of claim 1 wherein the electrode comprises graphite.

3. The detector of claim 1 wherein the housing defines an interior chamber having voltage measuring circuitry therein.

4. The detector of claim 3 wherein the circuitry comprises a voltage measuring circuit arranged to be selectively coupled between respective electrodes of two of a plurality of detectors disposed on tow cables at spaced apart positions.

5. The detector of claim 1 wherein the housing comprises fiber reinforced plastic.

6. The detector of claim 1 wherein the housing comprises a generally elliptically shaped midsection and a generally conically shaped aft section.

7. The detector of claim 1 wherein the housing comprises at least two stabilizers coupled thereto proximate the aft section and arranged on opposed sides of the housing.

8. The detector of claim 1 wherein the housing defines at least one interior compartment filled with an electrically non-conductive, substantially incompressible fluid, a volume of the compartment and density of the fluid selected to provide the housing with substantially neutral buoyancy in water.

9. A marine electromagnetic survey system, comprising:

a survey vessel configured to tow at least one pair of spaced apart detectors, each detector including a housing formed from electrically substantially non-conductive material, the housing shaped to provide a surface for placement of an electrode disposed in substantially laminar flowing water as the housing is moved through water, the housing shaped to provide minimal resistance to flow of water therepast, each detector including fins coupled to the housing and projecting outwardly therefrom, the fins each shaped to stabilize motion of the housing through water and each to provide attachment location for a tow cable, the fins disposed symmetrically about the housing, each detector including an electrode disposed on the surface, the electrode formed from an electrically conductive, substantially non-metallic material; and two, substantially coplanar, parallel tow cable towed by the survey vessel and each coupled to one of the attachment locations on each housing, the tow cables configured to conduct signals between the two housings.

10. The system of claim 9 wherein the electrode comprises graphite.

11. The system of claim 9 wherein the housing defines an interior chamber having voltage measuring circuitry therein.

12. The system of claim 11 wherein the circuitry comprises a voltage measuring circuit arranged to be selectively coupled between respective electrodes of two of a plurality of detectors disposed on tow cables at spaced apart positions.

13. The system of claim 9 wherein the housing comprises fiber reinforced plastic.

14. The system of claim 9 wherein the housing comprises a generally elliptically shaped midsection and a generally conically shaped aft section.

15. The system of claim 9 wherein the housing comprises at least two stabilizers coupled thereto proximate the aft section and arranged on opposed sides of the housing.

16. The system of claim 9 wherein the housing defines at least one interior compartment filled with an electrically non-conductive, substantially incompressible fluid, a volume of the compartment and density of the fluid selected to provide the housing with substantially neutral buoyancy in water.

17. The system of claim 9 wherein the tow cables coupled to each detector are substantially coplanar and arranged symmetrically about each detector.

18. A method for marine electromagnetic surveying, comprising:

moving a field source generator through a body of water;

at selected times passing an electrical current through the field source generator and inducing at the generator at least one of a time varying magnetic field and a time varying electric field in formations below the bottom of the body of water;

moving at least one sensing element through the body of water along a tow direction; and detecting, using the sensing element, at least one of a magnetic field and an electric field resulting from interaction of the induced field with the formations, the moving performed to minimize turbulence in the water and to minimize motion of the sensing element other than along the tow direction.

19. The method of claim 18 wherein the detecting comprises measuring a voltage between two sensing elements moved through the water spaced apart from each other, each sensing element moved so as to minimize turbulence in the water and to minimize motion of the sensing element other than along the tow direction.

20. The method of claim 18 wherein the detecting comprises measuring a property of a magnetic field.

21. The method of claim 18 wherein the inducing comprises inducing a vertical dipole magnetic field.

22. The method of claim 18 wherein the inducing comprises inducing a horizontal dipole electric field.

* * * * *